Nov. 7, 1967  D. BREEDING  3,350,816
SHAPING DEVICE
Filed Jan. 25, 1965  4 Sheets-Sheet 2
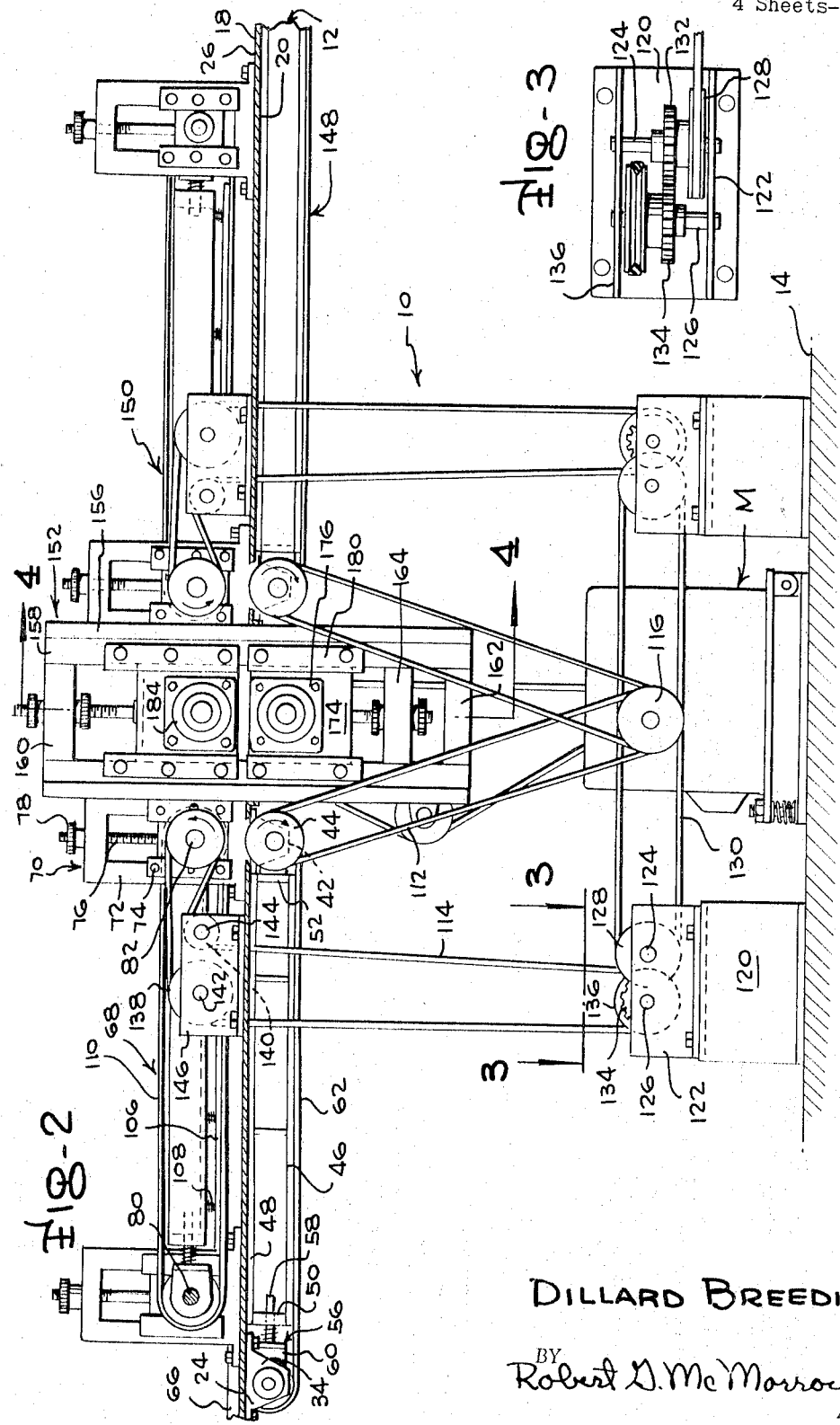
INVENTOR
DILLARD BREEDING
BY Robert D. McMorrow
ATTORNEY Nov. 7, 1967
D. BREEDING
3,350,816
SHAPING DEVICE
Filed Jan. 25, 1965
4 Sheets-Sheet 3
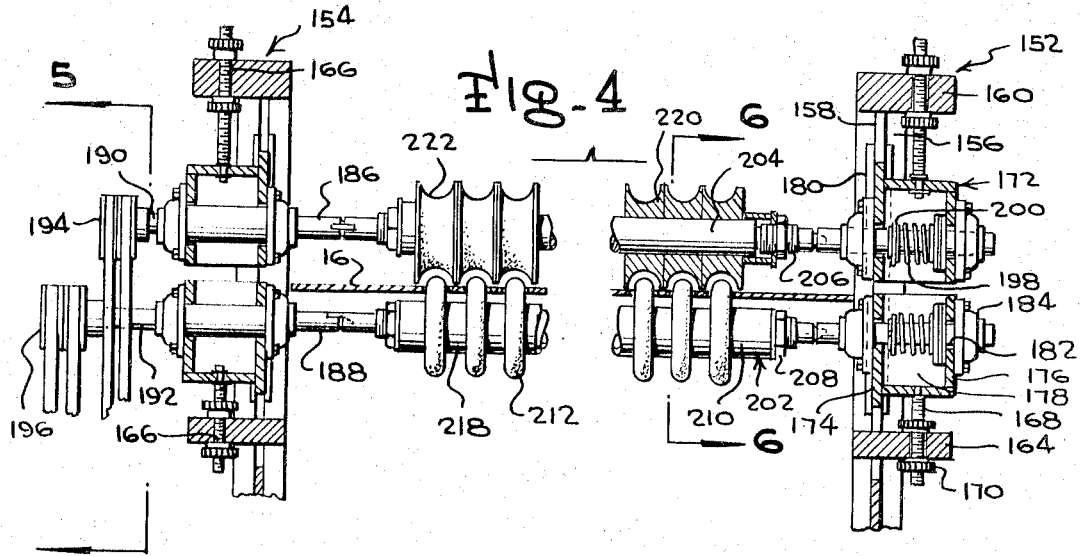
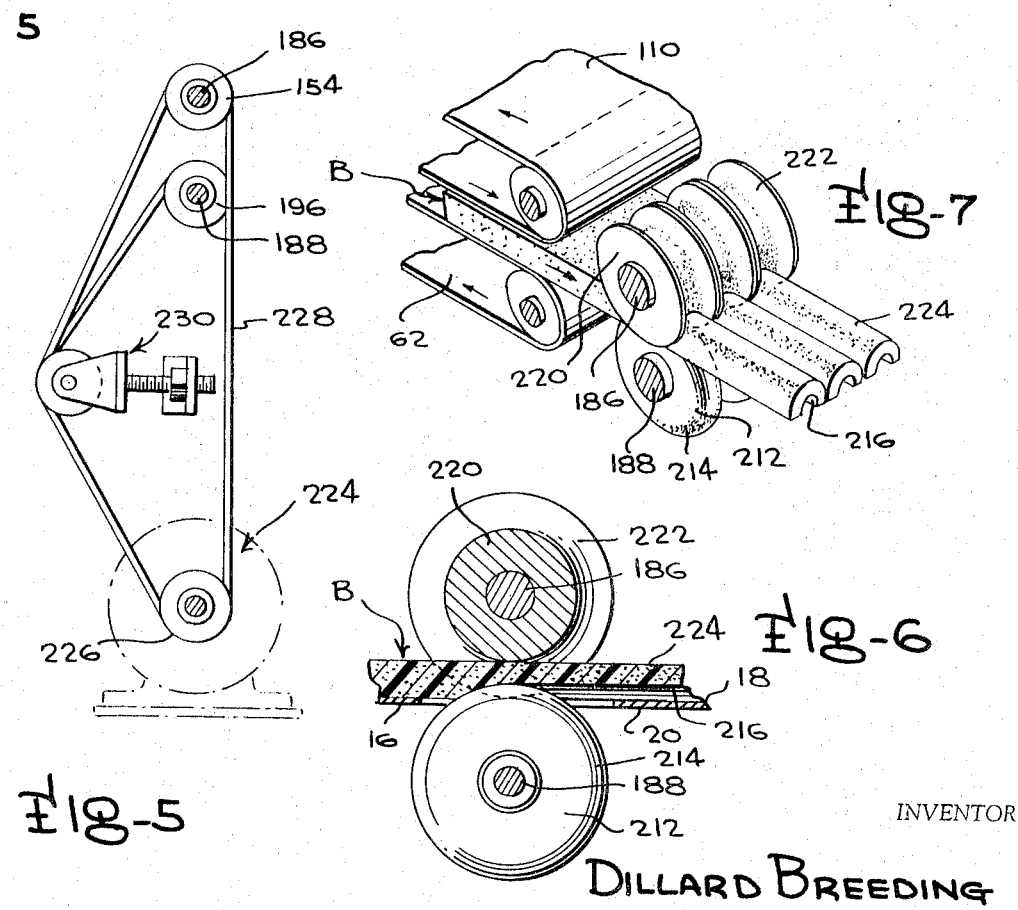
INVENTOR
DILLARD BREEDING
BY Robert G. McMorrow
ATTORNEY

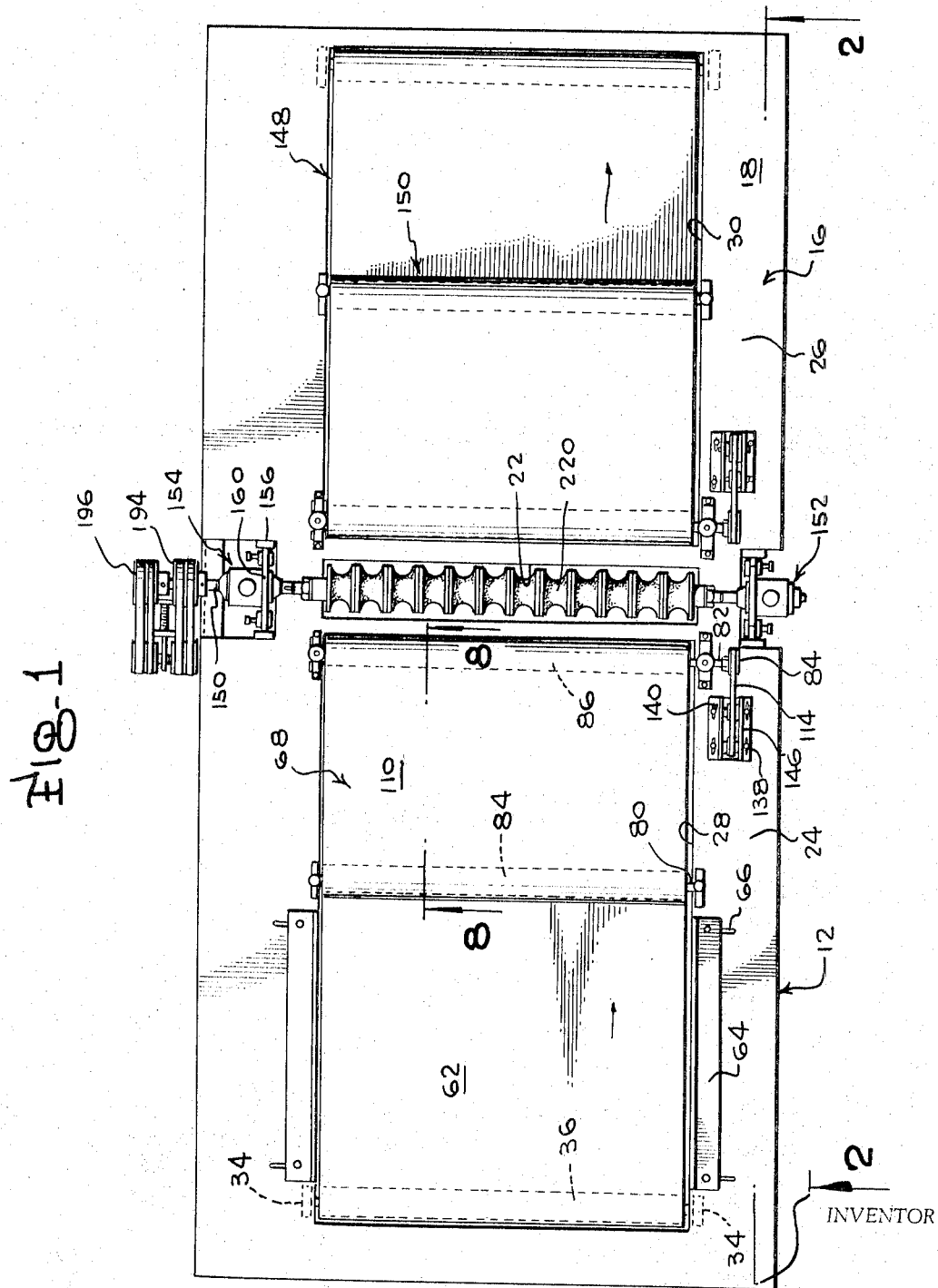

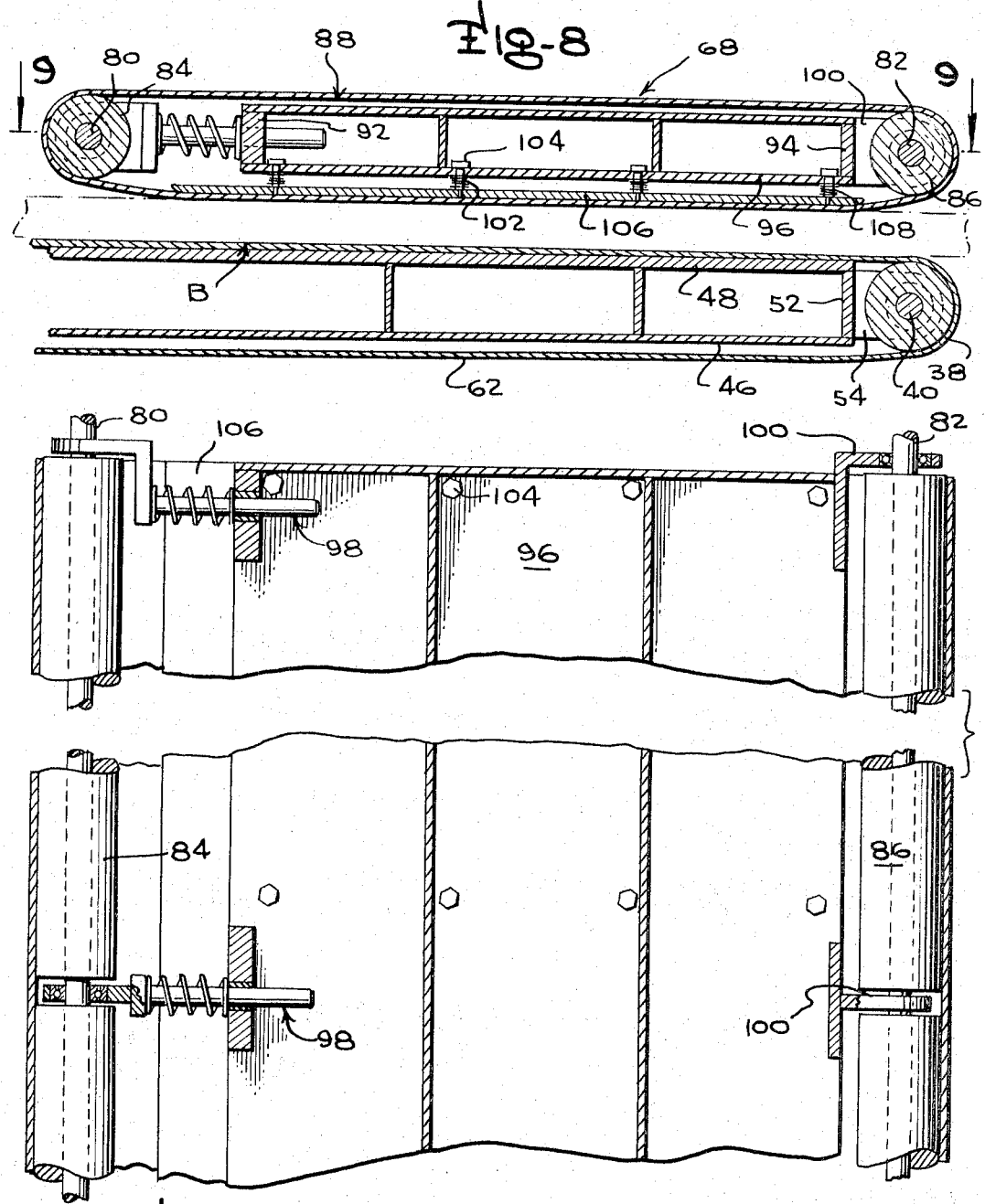

United States Patent Office 3,350,816
Patented Nov. 7, 1967

3,350,816
SHAPING DEVICE
Dillard Breeding, P.O. Box 9446,
Nashville, Tenn. 37204
Filed Jan. 25, 1965, Ser. No. 427,614
3 Claims. (Cl. 51—80)

ABSTRACT OF THE DISCLOSURE

A machine for shaping plastic materials having an input conveyor system and abrading means of complementary configuration between which the material is placed by the conveying system.

---

This invention pertains to shaping machinery of diverse utility and particularly to shaping machinery suited to employment in the fabrication of pipe insulation sections from materials susceptible of cutting and/or shaping by abrading.

A basic object of the machinery herein disclosed resides in the provision of a machine adapted for the shaping of pipe insulation sections or the like from blanks of standard form and dimension, with minimum manipulation of the machine or the blank and maintaining uniformity of the shaping of the finished product. A related objective concerns the provision of novel feed and discharge assemblies which move the materials and finished product through the machinery in a uniform manner.

Another objective of importance concerns the provision of cooperating, juxtaposed abrading or cutting elements acting substantially simultaneously on a blank of material to cooperatively shape opposite sides thereof to predetermined configurations. In a specific illustration, this shaping relates to the formation of such insulation into elongated strips of semicircular cross-section, adapted for use in pairs to fit about pipe sections and insulate the same.

The present machinery provides for dual, substantially simultaneous operation, functioning to cooperatively shape two sides of a workpiece in a single operation, thereby decreasing the time involved in the performance of multiple shaping operations and the handling required. Further, the machinery has self-compensating means for maintaining uniformity in the shaping process despite some variance in dimension of the blank material.

Yet another object is to provide a machine as aforesaid having adjustment means for use with blanks of different initial dimension and having means for variance in the shaping tool dimension and/or structure to change the thickness of the finished product.

A further object is to supply a machine wherein tool assemblies may be substituted where required by change of material to be shaped, or readily replaced or repaired when worn.

Other and further objects and advantages will become apparent to those skilled in the art, from a consideration of the following specification when read in conjunction with the annexed drawings, in which:

FIGURE 1 is a top plan view showing a shaping device constructed and assembled in accordance with the teachings of this invention;

FIGURE 2 is an enlarged view from one side of the machine, in section along the line 2—2 of FIGURE 1, and partially broken away;

FIGURE 3 is a detailed view, along the line 3—3 of FIGURE 2, looking in the direction of the arrows;

FIGURE 4 is an enlarged foreshortened sectional view taken substantially on the line 4—4 of FIGURE 2, looking in the direction of the arrows;

FIGURE 5 discloses a typical belt arrangement for driving the shaping tool elements hereof;

FIGURE 6 is an enlarged detail sectional view on the line 6—6 of FIGURE 4, showing the shaping machine in operation;

FIGURE 7 is a perspective view of the shaping machine and input conveyor belts, indicating typical operation;

FIGURE 8 is an enlarged detail view on the line 8—8 of FIGURE 1, looking in the direction of the arrows; and FIGURE 9 is an enlarged, foreshortened sectional view taken on the line 9—9 of FIGURE 8 looking in the direction of the arrows.

Referring to the drawings in greater detail, and initially to FIGURES 1 and 2, the machine 10 hereof is seen therein to include a frame 12 suitably supported on a floor 14, or the like. The frame 12 includes a table or bed 16 having a top 18 and an underside 20, and having a substantially rectangular opening 22 therein separating an input side 24 from a removal side 26 thereof. Each of the sides has enlarged transfer belt openings 28 and 30, respectively, formed therein.

A lower input conveyor assembly 32 is provided and includes a pair of brackets 34 secured to the underside 20 of the bed 16 adjacent the outer end of the opening 28. An elongated, substantially cylindrical, sectional roller 36 is rotatably supported on an axle extended between the brackets 34, and a longitudinally aligned drive roller 38 (FIGURE 8) is rotatably mounted on a shaft 40 extending through bearing brackets 42 mounted adjacent the forward end of the opening. The shaft 40 extends outwardly of the bracket 42 on one end and has a drive pulley 44 thereon. An inner belt support frame 46, including a top 48 and ends 50, 52 is mounted between the rollers, the ends 52 having a plurality of extended ears 54 interposed between the rollers, and through which the shaft 40 rotatably extends. The ends 50 have outwardly projecting ear assemblies 56 including shafts 58 extending through openings therein, and the assemblies include apertured ears 60, and coil springs interposed between the ends and the ears 60. An elongated endless belt 62 is trained about the rollers 36 and 38, having upper and lower flights in its path of travel thereabout, the upper flight passing over the top 48 of the inner support frame which provides a stable support surface therefor.

As shown in FIGURE 1, a pair of L-shaped guides 64 are mounted on the top 18 of the bed on the opposite sides of the opening 28 and serve to prevent misalignment of material on the belt upper flight. The guides are mounted in elongated slots 66, providing for some adjustment therein for the accommodation of material of varying width.

The top 18 of the bed 16 has mounted on its side 24 an upper input conveyor assembly 68. The assembly 68 includes spaced pairs of vertically adjustable bearing brackets 70, each including an outer frame 72 with an inner bearing assembly 74 mounted therein, and a threaded rod 76 with a control knob 78 adapted to set the height of the bearing within the frame. The brackets 70 are arranged in pairs on opposite sides of the opening 28, forwardly of the guides 64. The bearings have axles 80 and 82 extended therethrough and as seen in FIGURE 1, the axle 82 has an extended end with a drive pulley wheel 84 thereon. Referring to FIGURE 9, it is shown that the axles each carry sectional rollers 84 and 86, respectively, and that a pressure plate assembly 88 is mounted therebetween.

The pressure plate assembly 88 includes a frame 90 with ends 92, 94 and a base 96. Plural ear assemblies 98 (identical to the ear assemblies 56) connect the frame to the axle 80, and ears 100 (identical to the ears 54), connected to the axle 82. A plurality of hanger rods 102 with enlarged heads 104 extend through openings in the base 96 and are fixed to a substantially rectangular pressure plate 106—a coil spring 108 being mounted between the plate and base about each of the rods. A belt 110 is trained about the rollers 84 and 86 and has upper and lower flights, the lower flight being constantly biased in the direction of the upper flight of the belt 62 and the inner belt support by the pressure plate 106.

Means is supplied for movement of the belts in the directions indicated in FIGURE 7. The invention contemplates any suitable type of power source, but for illustration and example, shown in FIGURES 1 and 2 are belts 112 and 114 each connected to a motor driven pulley wheel assembly 116. The belt 112 extends between the wheel 44 and wheel assembly 116 directly, while the belt 114 is remotely connected to a geared reversal assembly 118, best shown in FIGURE 3. The assembly 118 is secured on a floor mount 120, and includes spaced side walls 122, with axles 124 and 126 extending therebetween. The axle 124 carries a pulley 128, which is drivingly connected by belt 130 to the wheel assembly 116, and a gear 132. Axle 126 has a gear 134 meshed with gear 132 and driven thereby in an opposite direction and a pulley 136 driving the belt 114. As seen in FIGURES 1 and 2, the belt 114 extends through an opening in the bed 16, and about wheels 138 and 140 mounted on axles 142, 144 extending between plates 146 and providing a right angular turn of the belt.

The belts are powered by a motor assembly M, of any suitable type mounted on the floor 14.

On the removal side 26, the bed 16 has a second pair of conveyor assemblies, including a lower removal conveyor assembly 148 and an upper removal conveyor assembly 150. The assemblies 148 and 150 are identical, dimension excepted, to the upper and lower input conveyor assemblies before described and are likewise powered by the motor assembly M, as is clearly seen in the drawings.

Secured to the bed 16 at each side, adjacent the openings 22, are similar but opposite, vertically mounted tool support casings 152 and 154.

The casings 152, 154 each include side elements 156 with inward portions 158, fixed upper and lower cross pieces 160, 162, and fixed intermediate cross pieces 164. The upper cross pieces 160 and intermediate cross pieces 164 have threaded openings 166 therein and threaded height adjustment screws 168 are mounted in these openings. Each screw 168 is provided with lock nuts 170, and each screw carries a box like bearing 172.

The bearing 172 comprise inner walls 174 and outer walls 176 with connecting sides 178. Pairs of end plates 180 are secured to the sides of the walls 174 providing channels engaged about the inward portions 158 of the casing. The walls 174, 176 have coaligned apertures 182 therein, with bearings 184 aligned therewith.

Elongated, substantially cylindrical upper and lower shafts 186, 188 extend through the apertures and bearings, the shaft having extended ends 190 and 192 respectively, provided with dual pulley driving wheels 194 and 196. The bearings 172 of the casing 152 have coil springs 198 therein biasing collars 200 on the shafts, to constantly urge the shafts in the direction of the casings 154.

The shafts 186 and 188, best shown in FIGURE 4, are each of sectional form for ease of disassembly. Each has a demountable central section 202 with an interior rod 204 and threaded end sections 206. Lock nuts 208 are engaged on the end sections, and the tool pieces (described below) are received on the interior rods and held in place by sleeves 210 engaged by the lock nuts 208. The invention involves tool pieces adapted to act on blanks of insulation material. Examples of the types of material contemplated are, without limitation, foam plastic, "Foamglas," "Fibreglas," vegetable cork board, Styrofoam, polystyrene, bead board, urethane, magnesia and "Careytemp." Due to different characteristics of material to be shaped, the shaping tools per se will be formed of materials changed in accordance with the material to be shaped. In general, abrasive type cutting wheels are employed, but characteristics of each material require the substitution of various types of cutters, including in some cases metallic bladed cutters. For use in the shaping of foam type plastic, abrasive tools as herein shown are preferred. The tools comprise a first series of substantially discoidal wheels 212 with rounded outer ends 214 adapted to form a concave groove 216 in the blank B. Preferably, a series of wheels 212 are mounted in transversely spaced relation on the shaft 188, being spaced by sleeves 218. The shaft 186 carries a corresponding series of vertically juxtaposed wheels 220 with concave outer sides 222, forming convex outer sides 224 on the blank B vertically aligned with the grooves 216.

The shafts and wheels are powered by a motor 224 with a pulley wheel assembly 226. Belts 228 are trained about the wheel member 226 and the wheels 194, 196, and a tension assembly 230 is provided.

In operation, the blank B of insulation material is engaged by the input conveyors and guided thereby between the cutting wheels. The pressure plate and belt support means provide uniformity of feed, and as the shaped material extends through the cutting area, it is engaged by the removable belt assemblies 148 and 150 which also include a pressure plate and belt support to insure continued uniformity of movement and location of the material.

Having described and illustrated an embodiment of this invention in some detail, it will be understood that this description and illustration is offered by way of example only, and that the invention is to be limited in scope only by the appended claims.

What is claimed is:

1. A device for the formation of plural, elongated pipe insulation halves from elongated blanks of insulation material, the device comprising:

a frame including an elongated bed having input and removal sides and having an opening formed therein;

upper and lower input conveyor assemblies arranged for movement of the blanks of insulating material along the bed of one side of the opening;

upper and lower removal conveyor assemblies arranged for movement of the insulation halves along the bed on the other side of the opening;

the conveyor assemblies each including brackets secured to the bed, rollers mounted in the brackets, and belts trained about the rollers;

the upper conveyor assemblies each including pressure plate assemblies adapted to bias the material downwardly;

a shaping assembly comprising brackets secured to the bed and transversely aligned with the opening thereof, a pair of shafts mounted in the brackets, and shaping members carried by the shaft:

the shaping members including vertically opposed concave and convex abrading wheels; and means for rotating the belts and the abrading wheels.

2. A device for the formation of plural, elongated pipe insulation halves from elongated, substantially rectangular blanks of insulation material, the device comprising:

a frame including an elongated flat bed including a top side and an underside, the bed having input and removal sides and having an opening formed therein between the input and removal sides;

upper and lower input conveyor assemblies arranged for movement of the blanks of insulating material along the bed on one side of the opening;

upper and lower removal conveyor assemblies arranged for movement of the insulation halves along the bed on the other side of the opening;

the lower conveyor assemblies each including transversely aligned pairs of brackets secured to the bed, rollers mounted in the pairs of brackets, an inner belt support mounted between the rollers and belts trained about the rollers;

the upper conveyor assemblies each including pairs of transversely aligned, vertically adjustable brackets secured to the top of the bed, rollers mounted in the brackets, a pressure plate assembly mounted between the rollers including a pressure plate, and a belt trained about the roller;

the belt of the upper conveyor assembly having upper and lower flights, and the pressure plate bearing against the lower flight to constantly bias the same in the direction of the lower conveyor assembly;

a shaping assembly comprising brackets secured to the bed and aligned with the opening thereof, a pair of axles mounted in the brackets, and shaping members carried by the axles;

the shaping members including a first series of wheels of substantially discoidal form selectively spaced apart and adapted to grind a concave groove in the material, and second wheels over and spaced from the first wheels, comprising a plurality of spaced apart abrading members with concave outer sides adapted to grind convex ridges on the material; and means for rotating the belts and wheels.

3. A device for the formation of elongate sections of material from initial blanks having upper and lower sides, the device comprising:

a frame having a bed with an input side and a removal side;

input conveyor means arranged on the input side of the frame to engage the blanks of material;

removal conveyor means to engage the sections following formation in the device, the removal conveyor means being located on the removal side of the frame;

each of the conveyor means including opposed belts to grip the material for movement;

pressure plate means to maintain the material in desired orientation to the frame;

a shaping assembly comprising bracket means secured to the bed in a transverse position intermediate the input and removal conveyor means, and shaft means mounted on said bracket means; and opposed abrading members of complementary shape on the shaft means, the abrading members acting on the upper and lower sides of the blanks to produce the sections of material.

References Cited

UNITED STATES PATENTS

| | | | |
|---|---|---|---|
| 450,929 | 4/1891 | Davies | 51—215.5 X |
| 2,064,406 | 12/1936 | Bialkowsky | 51—80 |
| 2,466,082 | 4/1949 | Craig | 51—215.5 X |
| 2,637,949 | 5/1953 | De Bay | 51—80 |
| 2,948,086 | 8/1960 | Eger | 51—80 |
| 3,307,297 | 3/1967 | Lawson | 51—80 |

ROBERT C. RIORDON, *Primary Examiner.*

D. G. KELLY, *Assistant Examiner.*